(12) United States Patent
Koskimies

(10) Patent No.: US 7,320,011 B2
(45) Date of Patent: Jan. 15, 2008

(54) SELECTING DATA FOR SYNCHRONIZATION AND FOR SOFTWARE CONFIGURATION

(75) Inventor: Oskari Koskimies, Helsinki (FI)

(73) Assignee: Nokia Corporation, Espoo (FI)

( * ) Notice: Subject to any disclaimer, the term of this patent is extended or adjusted under 35 U.S.C. 154(b) by 384 days.

(21) Appl. No.: 10/309,570

(22) Filed: Dec. 4, 2002

(65) Prior Publication Data

US 2003/0233383 A1 Dec. 18, 2003

Related U.S. Application Data

(63) Continuation-in-part of application No. 10/170,329, filed on Jun. 12, 2002, now abandoned.

(30) Foreign Application Priority Data

Jun. 15, 2001 (FI) ................................. 20011277

(51) Int. Cl.
*G06F 17/30* (2006.01)
(52) U.S. Cl. ........................ 707/201; 707/10
(58) Field of Classification Search ................ 707/201, 707/200, 202, 203, 10; 455/456.1; 340/905
See application file for complete search history.

(56) References Cited

U.S. PATENT DOCUMENTS

| 5,706,509 A | 1/1998 | Man-Hak Tso | 395/617 |
|---|---|---|---|
| 5,884,325 A | 3/1999 | Bauer et al. | 707/201 |
| 5,926,816 A | 7/1999 | Bauer et al. | 707/8 |
| 6,012,063 A | 1/2000 | Bodnar | 707/101 |
| 6,014,090 A * | 1/2000 | Rosen et al. | 340/905 |
| 6,052,735 A | 4/2000 | Ulrich et al. | 709/236 |
| 6,195,622 B1 | 2/2001 | Altschuler et al. | 703/2 |
| 6,654,746 B1 * | 11/2003 | Wong et al. | 707/10 |
| 2002/0078075 A1 | 6/2002 | Colson et al. | 707/204 |
| 2002/0143782 A1 | 10/2002 | Headings et al. | 707/100 |
| 2003/0054833 A1 * | 3/2003 | Hayduk | 455/456 |

FOREIGN PATENT DOCUMENTS

| WO | WO 00/54525 | 9/2000 |
|---|---|---|
| WO | WO02/077860 A1 | 10/2002 |

(Continued)

OTHER PUBLICATIONS

Jiang Z et al: "WEB Prefetching in a Mobile Environment" IEEE Personal Communications, IEEE Communications Society, US, vol. 5, No. 5, Oct. 1998, pp. 25-34, XP000786613 ISSN: 1070-9916.

(Continued)

*Primary Examiner*—Paul Rodriguez
*Assistant Examiner*—Luke Osborne
(74) *Attorney, Agent, or Firm*—Perman & Green, LLP

(57) ABSTRACT

According to a first aspect of the invention metadata between user data items and software data items is maintained. The utility of at least one user data item is determined on the basis of the properties of one or more software data items related to the user data item in the metadata. The user data item and one or more software data items related thereto are selected to the data set for synchronization in response to the utility of the user data item meeting a predetermined criterion.

27 Claims, 6 Drawing Sheets

FOREIGN PATENT DOCUMENTS

| WO | WO02/086758 A1 | 10/2002 |
| WO | WO02/093427 A1 | 11/2002 |

OTHER PUBLICATIONS

Padmanabhan Venkata N et al: "Using Predictive Prefetching To Improve World Wide Web Latency" IEEE Transactions On Antennas And Propagation, IEEE Inc. New York, US, vol. 26, No. 3, Jul. 1996, pp. 22-36, XP002104433 ISSN: 0018-926X.

Pissinou N et al: "A New Framework for Handling Mobile Clients in a Client-Server Database System" Computer Communication, Elsevier Science Publishers BV, Amsterdam, NL, vol. 23, No. 10, May 2000, pp. 936-941, XP004197808 ISSN: 0140-3664.

\* cited by examiner

SELECTING DATA FOR SYNCHRONIZATION AND FOR SOFTWARE CONFIGURATION

This application is a continuation-in-part of U.S. patent application Ser. No. 10/170,329 filed on Jun. 12, 2002, status abandoned.

BACKGROUND OF THE INVENTION

The invention relates to selecting data for synchronization and for software configuration. Data synchronization is an operation in which a correspondence is provided between at least two data collections to the effect that, after the synchronization, the data items of the data collections substantially correspond to each other.

Along with the increasing popularity of new networking terminals, such as portable computers, PDA (Personal Digital Assistant) devices, mobile stations and pagers, the need for data synchronization has increased as well. Data of calendar and electronic mail applications in particular are typical examples of data that need to be synchronized. Synchronization has conventionally been based on different proprietary protocols, which are not compatible with each other. However, in mobile communications in particular, it is important that data can be obtained and updated irrespective of the terminal and application in use.

For improved synchronization of application data, a Synchronization Mark-up Language (SyncML) based on the Extensible Mark-up Language (XML) has been developed. A SyncML synchronization protocol employing messages of SyncML format allows the data of any application to be synchronized between any networked terminals. The SyncML synchronization protocol functions both in wireless and in fixed networks and supports a plural number of transmission protocols. SyncML provides both a synchronization protocol and a data representation protocol.

The implementation of data synchronization is described in the SyncML standard, but the standard does not specify in detail how to select the data that is to be synchronized. Typically, the amount of data on a server or desktop computer considerably exceeds the capacity of a portable device. Even larger portable terminals, such as portable computers, are not necessarily able to store all the data needed by the user, for example copies of every important document contained in a company's data system. If synchronization is carried out over the radio interface, further restrictions are caused by the available bandwidth. From the user's point of view, synchronization over the radio interface may appear to be too slow, and in a mobile communications network the transmission costs may be too high. Consequently, it is necessary to restrict the amount of data to be synchronized by selecting only a subset of the data for synchronization. This may be called 'adaptive synchronization'. Known solutions for adaptive synchronization have mainly been restricted to certain application-specific techniques that simply allow specific data units to be excluded from the data to be synchronized. A typical example is to rule out electronic mail attachment files.

Besides data carrying non-executable user data, also data carrying software components can be downloaded or synchronized to a data terminal. As is familiar in PC environment, after the first installation it is very often necessary to download and install new updates or plug-ins to the computer. Some applications enable to download an update allowing a file of an unsupported file format to be opened. As wireless data transmission technologies have advanced, it is also possible to download new software components into wireless data terminals. The radio bandwidth is, however, limited and software updates via the air interface can be expensive. Also the user typically needs to know the already existing software components and select the correct update or plug-in to be downloaded. A lot of unnecessary or incompatible software data may be transferred to the terminal, burdening the terminal resources and causing transmission expenses.

Current synchronization systems do not enable to consider software that is related to a user data item, i.e. a data item carrying substantially only user data, being synchronized. For instance, if a user data file is synchronized to a data terminal and the software configuration of the terminal does not support the file type, additional software needs to be downloaded. This may be troublesome especially for wireless terminals as software may be slow and expensive to download.

BRIEF DESCRIPTION OF THE INVENTION

It is an object of the invention to provide an improved method and equipment implementing the method to allow more sophisticated adaptive selection of data for synchronization or for software configuration. The objectives of the invention are achieved with methods, synchronization system, synchronization device, server device, data terminal and computer software products characterized by what is stated in the independent claims. Preferred embodiments of the invention are disclosed in the dependent claims.

According to first aspect of the invention metadata between user data items and software data items is maintained. The utility of at least one user data item is determined on the basis of the properties of one or more software data items related to the user data item in the metadata. The user data item and one or more software data items related thereto are selected to the data set for synchronization in response to the utility of the user data item meeting a predetermined criterion.

This enables to take into account the properties of the software related to the user data item when deciding whether to select the user data item for synchronization. Since useful data items and related software data items can be automatically selected for synchronization, the user does not need to separately define or restrict the user data items or the software data items to be synchronized, which provides improved usability. As only useful user data items and software data items are selected for synchronization, the restricted terminal resources and the limited bandwidth available in wireless data transmission can be more efficiently utilized.

According to a second aspect of the invention at least one user data item is selected and the utility of the user data item is determined on the basis of the properties of one or more software data items related to the user data item in the maintained metadata. The software data items related to the user data item are selected for the data terminal in response to the utility of the user data item meeting at least one predetermined criterion.

The latter aspect of the invention enables easy and adaptive selection of software for the data terminal. This facilitates an intelligent synchronization and software management system providing dynamic software configuration based on metadata between user data items and software data items. Such adaptive software configuration is especially useful in wireless devices having limited memory as, according to one embodiment, the size of the related software components can be considered when determining whether to download the user data item and the related software to the client data terminal. It should be noted that the user data item whose utility is determined may already be present in the data terminal or it may be transferred to the data terminal along with the software data items.

The term 'software data item' refers to an executable software data item or a non-executable software data item. The term 'executable software data item' refers generally to any data item carrying an executable program code. The term 'non-executable software data item' refers generally to any data item which increases the usefulness of an application or which is obligatory for the application but does not contain an executable program code. One or more executable software data items may form a software component, for instance a new application or a plug-in program for the terminal. Non-executable software data items include for example a database (not subject to separate synchronization, e.g. a dictionary), configuration files, clipart library etc.

The term 'user data item' refers generally to any data item which is not a software data item. A user data item carries non-executable data to be processed by some application, for instance a calendar entry or an email message or a part thereof. Utility expresses the usefulness of a data item associated with an initial data item in the metadata, either directly or over a link through other data items, provided that the initial data unit has been selected. Utility can thus be a property of either a data item or of a link between data items. A combination is also possible, so that the used utility value is calculated from a value attached to the data item and a value attached to the relationship (e.g. by adding or multiplying the values). Utility can be thought of as added value obtained by a related data item, or, on the other hand, as a loss, if the data item is not available even if it were needed.

The embodiments illustrated in the method claims of the first aspect of the invention can be applied also to the second aspect of the invention and vice versa.

According to a preferred embodiment of the invention, the size of the one or more software data items related to the user data item is calculated and the utility of the user data item is determined on the basis of the size of the related software data items.

According to a preferred embodiment of the invention, at least some of the related software data items are associated with compatibility information and the compatibility information is compared with the properties of the data terminal to which the software data items are to be transferred. Incompatible software data items are excluded from the selection. This embodiment further improves the appropriateness of the selection of software data.

BRIEF DESCRIPTION OF THE DRAWINGS

In the following, the invention will be described in connection with the preferred embodiments and with reference to the accompanying drawings, in which.

DETAILED DESCRIPTION OF THE INVENTION

Figure 1:
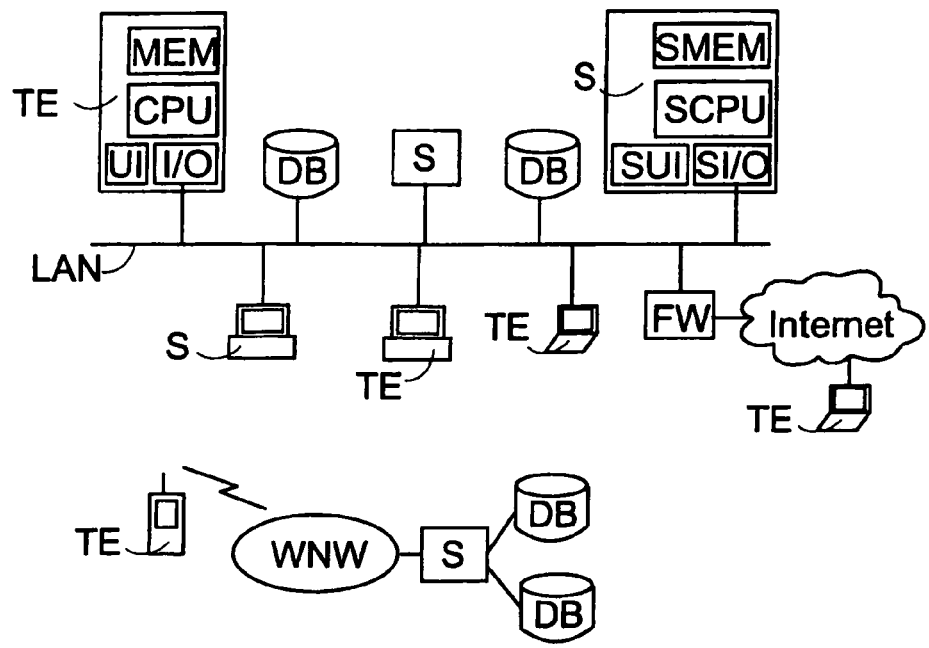
FIG. 1 is a general view of a data system in which the data of the data collections can be synchronized.

FIG. 1 illustrates a networked data system, in which data comprised in separate databases DB and terminals TE can be synchronized. From the point of view of synchronization, the terminal TE is a Client Device, and it is typically a portable computer, PDA device, mobile station or pager, and a synchronization server S is a server, typically serving a plurality of client devices. However, the synchronization server is not restricted to any particular equipment type; unlike in the example described, a terminal can also function as a synchronization server. FIG. 1 shows two examples, the first one of which comprises terminals TE, databases DB and synchronization servers S connected to a Local Area Network LAN. A terminal TE connected to the network LAN comprises a functionality, such as a network card and software controlling data transmission, for communicating with the devices in the network LAN. The local area network LAN may be a local area network of any type, and the TE may communicate with the server S also over the Internet, typically through a firewall FW.

In the second example, the terminal TE, synchronization server S and databases DB are connected to a wireless network WNW. The terminal TE connected to the network WNW comprises a mobile communications functionality for wireless communication with the network WNW. The wireless network WNW may be any already known or future wireless network, such as a network supporting a GSM service, a network supporting a GPRS service (General Packet Radio Service), a third generation mobile communications network, such as a UMTS network (Universal Mobile Telecommunications System), a wireless local area network WLAN, or a private network. It is to be noted that the server S may also comprise a database DB, although in FIG. 1 the servers S and the databases DB are separate, for the sake of clarity.

The terminals TE (in wired networks LAN and wireless networks WNW) and the servers S comprise memory MEM; SMEM, a user interface UI; SUI, I/O means I/O; SI/O for arranging data transmission, and a Central Processing Item CPU; SCPU comprising one or more processors. Data items are to be synchronized may be stored in the TE memory MEM (which, from the point of view of synchronization, may be a database to be synchronized), the database DB memory, as well as the server S memory SMEM. In response to a computer program code stored in the memory MEM; SMEM and executed in the central processing items CPU and SCPU, the terminal TE and the synchronization server S execute the inventive means, some embodiments of which are shown in FIGS. 4, 5, 8 and 9. The computer programs may be obtained through a network and/or they may be stored in memory means, such as a disc, CD-ROM disc or other external memory means from which they can be loaded into the memory MEM; SMEM. Hardware solutions or a combination of hardware and software can also be used.

Figure 2:
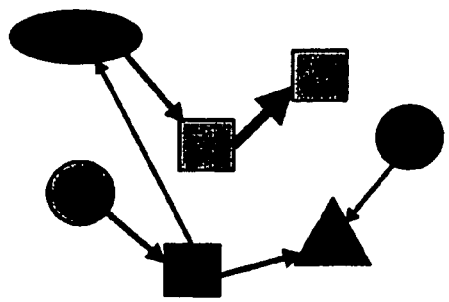
FIG. 2 is a metadata graph.

Metadata on the relationships between the data items are maintained in the system. FIG. 2 shows an example of a metadata graph. The nodes in the graph represent the data items and the links depicted by arrows illustrate the relationships between the data items. Each link is assigned at least one value expressing how closely the target node is associated with the source node (the closeness of the relationship). The metadata graph is preferably a directional network. As shown in FIG. 2, relationships between different types of data items (depicted in different shapes) are also preferably determined. A thicker link is used in FIG. 2 to denote a close relationship between the data items, whereas a thinner link is used for a remote relationship. According to a preferred embodiment, the data items may be user data items and/or software data items and the metadata graph describes relationships from a user data item to one or more software data items or relationships from a software data item to one or more other software data items. This embodiment is further described in the following figures and examples. A simple metadata graph could comprise for example an attachment file of an electronic mail data item linked with one or more software data items of an application required to open the attachment. The linked software data item may be e.g. an installation program for the required application.

Figure 3:
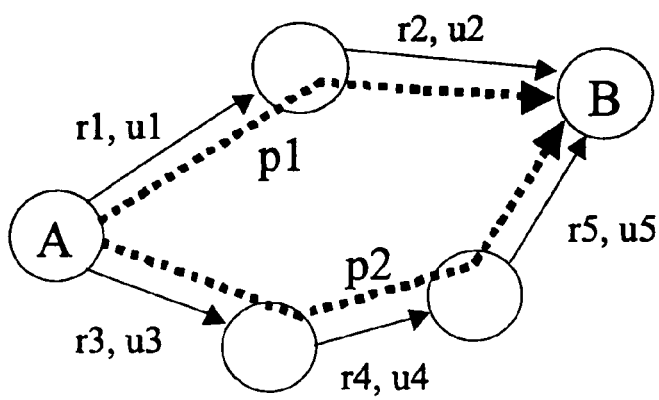
FIG. 3 shows a path illustrating the relationships between data items.

Synchronization requires the determining of an initial data set the data items of which are at least to be synchronized. The metadata links allow paths from the initial data set to another data item to be determined. FIG. 3 illustrates paths from initial data item A to data item B. The data items may be user data items and/or software data items. In a preferred embodiment, the relationship between the data items is denoted by relevance and utility. Relevance is a value representing the probability that the user will need a data item associated with an initial data item, either directly or through other data items, provided that the initial data item has been selected. In FIG. 3, relevance is denoted by ri. Utility expresses the utility of a data item associated with an initial data item in the metadata, either directly or over a link through other data items, provided that the initial data item has been selected. Utility can be thought of as added value obtained by a related data item, or, on the other hand, as a loss, if the data item is not available even if it were needed. In FIG. 3 utility is shown by ui, each link between A and B being provided with a relevance value ri and a utility value ui. The initial data item A and the related data item B may be connected by several paths. The different paths represent different reasons why a user who needs the initial data item A might also need the software data item B. In FIG. 3, there are two paths p1 and p2 between A and B, the paths having the following probabilities:

$$p1 = P(p1) = r1 * r2$$

$$p2 = P(p2) = r3 * r4 * r5.$$

Hence, the relevance of B to A is the product of the relevance values assigned to the data items along the path. B's utility to A is determined by the utility value of the last link, i.e. utility through path p1 is u2 and through path p2 it is u5. Gained Utility g is the utility of the software data items that the user would really request. Since the user's actions cannot be known in advance, gained utility is a random variable and therefore has a distribution and expected value. The closeness of the relationship between the data items A and B, i.e. the importance of the data item B in the selection of data item A, can be defined by calculating an Expected Gained Utility E(g) value. If the user needs the data item B for several different reasons (a plurality of paths p1, p2), the gained utility obtained with the data item B can be determined in the form of the maximum utility of the paths (max(u2,u5)). It is also possible to use the utility of an individual path or the combined utilities of different paths as the utility to be gained by data item selection. The expected gained utility E(g) is preferably calculated by taking into account both paths p1, p2, whereby the following is obtained:

$$E(g) = u2*P(p1)*(1-P(p2)) + u5*P(p2)*(1-P(p1)) + \max(u2,u5)*P(p1)*P(p2).$$

If the utility value ui of the links is set at one, the expected gained utility E(g) represents the probability of a data item being needed for some reason. Hence, in the example of FIG. 3, E(g) is $$P(p1)*(1-P(p2)) + P(p2)*(1-P(p1)) + P(p1)*P(p2) =$$
$$P(p1) - P(p1)*P(p2) + P(p2) - P(p2)*P(p1) + P(p1)*P(p2) =$$
$$P(p1) + P(p2) - P(p1)*P(p2) = P(p1 \cup p2).$$

A comparison of the expected gained utility E(g) values of related data items allows the data items comprising the highest values to be selected, in addition to the initial data items, into the selection data set that is to be synchronized. The metadata can be collected by applying a minimum spanning tree method or by means of content analysis, for example. To optimize the processing resources and the time required, deviations from the above calculation method can be made. For example, the number of paths to be taken into consideration can be restricted to only comprise direct links, in which case path length is one. Methods for restricting the number of the paths to be taken into account include Dijkstra's minimum path algorithm and Kruskal's algorithm.

A special case of a metadata link is a dependency (link), which describes a situation where another data item is needed in order for a data item to be useful. For example, the relationship between an application and a library the application uses is often a dependency, since the application cannot be used if the library is not available. A dependency requires special handling because the utility of a data item A (e.g. an application) can be achieved only if all the data items D1, D2, ... Dn, (e.g. libraries used by the application) to which there is a dependency link from A, are available. Thus, if data item A is selected to the selection set, then D1, D2, ... Dn must also be selected, otherwise selecting A is useless (and thus A should not be selected either). An example of a dependency link is given in FIG. 7, where there is e.g. a dependency link from a Word document (a project plan) to a Word application (dependency links are marked with thicker arrows in the figure). If there is no application that can be used to read the document, the document is useless. Thus the link is a dependency.

Figure 4:
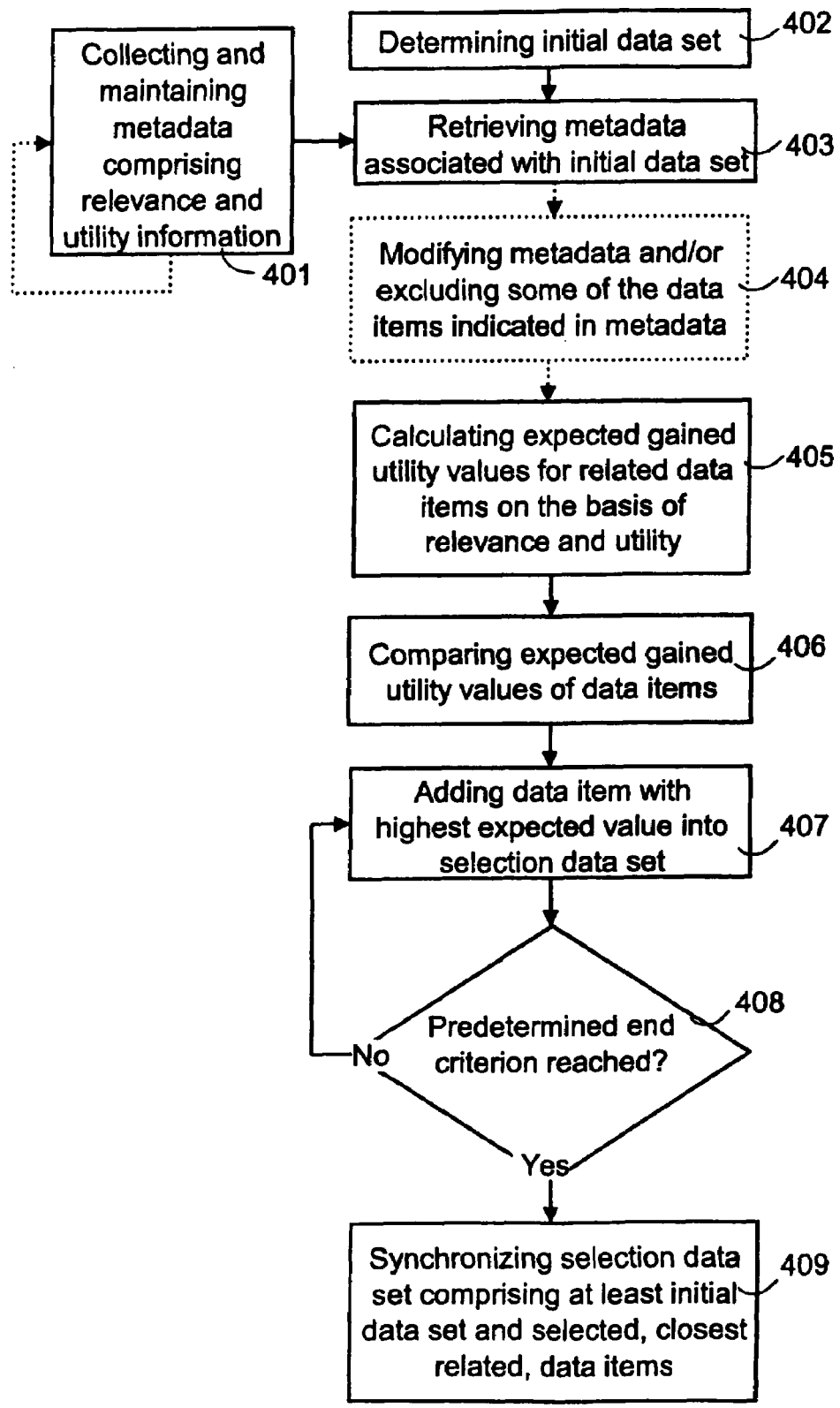
FIG. 4 is a flow diagram illustrating adaptive selection of data to be synchronized.

FIG. 4 illustrates one possible method for adaptive selection of data to be synchronized. Metadata comprising relevance and utility information are collected 401 into the system as described above. The metadata can be maintained in the memory MEM, SMEM in data structures, in the application executing the method, or in the application input data. Metadata can also be loaded from network databases, through the Internet, for example. To the metadata is added a new initial data item that is to be synchronized, the related software data items and utility and relevance values illustrating the relationships between them. According to a preferred embodiment, general rules are used, such as: the relevance value on a link from any electronic mail item to any related word processing application file is always 0.7. Consequently, the value 0.7 is always used, irrespective of the electronic mail item or the word processing application file, which reduces the space needed for storing the metadata.

In a preferred embodiment, the metadata is application-specific. In that case, new metadata needed for selecting data items for a new application are added for example to application-specific directories in the synchronizing device (TE, S). The metadata determines the relationships between electronic mail data items synchronized by an e-mail application, for example. In this embodiment the metadata from which the relationships between the data items are to be fetched are selected according to the application employed. Application-specific metadata can also be used for influencing the relationships between the data items of different applications by applying different relevance and/or utility values to the links between them. For example, a link from an electronic mail item to a word processing file has a higher relevance value than a link from a calendar entry to a word processing file. Application-specific metadata can also be used in a table format, for example, in which the relevance and/or utility values between different applications are given.

Metadata can be modified according to the purpose of use, and, in addition, different metadata can be used in different situations, i.e. for different synchronization contexts. For example, when a person is leaving for a business trip, the relevance of business card data items is higher than when s/he is leaving for a holiday trip. Metadata can be arranged for use in different synchronization contexts by applying different application- or device-level user profiles, similarly as user profiles arranged at mobile stations. Profile-specific metadata may be stored for the different profiles; it is also possible to modify the metadata or to select the data items to be synchronized on the basis of different criteria in different situations. Typical synchronization contexts include a general context, business trip, holiday trip, reading of electric mail messages and meetings. For example, when a meeting has been scheduled for the user (which can be stated from the calendar), data is synchronized with the user's terminal TE such that the business cards of those participating in the meeting form the initial data set and they are provided with links of high relevance values to the electronic mail messages last sent by the participants.

The user also has the possibility to influence the metadata, for example by adding new links between the data items, or to change the utility or relevance values of the links. To maintain good usability, a predetermined number of high-level user preferences can be defined, the metadata being automatically determined and modified according to the preferences. This could be illustrated by an example in which the user considers business cards not to be important and thus selects a low priority for them. The synchronization application may therefore set low relevance values for business cards. All preferences related to synchronization can be determined user-specifically, and the appropriate preferences can be selected using the user ID (the preferences can also be stored on an Integrated Circuit (IC) card, for example).

According to yet another embodiment of the invention, metadata can be collected and updated 401 by analyzing the contents of the data items. In response to changes in the data item contents, the relevance and/or utility values of the contents can be changed as well. One preferred embodiment is described later with FIG. 8.

Metadata updating 401 can be arranged to take place as an automatic monitoring of user actions. This means that a new data item with its relevance data can be automatically added to the metadata when the user requests for the data item in question. In addition, the frequency of use of the data items can be monitored and the relevance and/or utility values changed automatically on the basis of the monitoring. Relevance values can be changed on the basis of the frequency of use, and utility values on the basis of the duration of use, for example. The monitoring of user actions and automatic collection of metadata can be arranged by means of neural networks, for example.

When synchronization is needed, an initial data set is determined 402. The initial data set is preferably a predetermined application-specific set. The user may also add data items to or remove them from the initial data set. Next, metadata associated with the initial data items of the initial data set are retrieved 403, i.e. the links from the initial data items are defined.

According to an embodiment of the invention, metadata can be modified 404. For instance an application- or situation-specific transform function can be used for weighting different data items differently to provide synchronization profiles such as those referred to above. The transform function refers particularly to application- or situation-specific coefficients for the relevance and utility values of the different data items. The transform function is applied to the links between the data items, and the transformed relevance and utility values are then used at later stages (405). This embodiment provides an advantage in that the data items can be weighted differently for different purposes and situations, but employing as small a memory space as possible.

A time-based transform function could also be used in phase 404 or 401 e.g. to increase or decrease the relevance or utility of a data item as time passes. In some cases an alternative to modifying 404 metadata could be to use dynamic attribute values in metadata, so that e.g. the utility of a data item is always recalculated when needed. For example, the utility of a data item might be "3+number of months passed since Jan. 1, 2001".

It is also possible to exclude 404 some of the data items indicated in the metadata already before the expected gained utility values are calculated. The exclusion may be based on a minimum value set for utility and/or relevance, in which case only related data items of the initial data set that exceed the minimum value qualify as candidates for the selection data set. When a minimum relevance value is applied, a high-relevance link or a short path can be preferred over long paths of low relevance. If relevance is assigned a high minimum value, the impact of high utility value can be reduced in the selection of data items. For example, a minimum value set for utility allows the synchronization of data items easily obtainable by other means (and thus providing low utility), such as telephone numbers, to be prevented. Another possible exclusion criterion is path length, which allows data items that are too far away from the initial data set to be excluded. In addition, the exclusion method in step 404 allows limit values to be set, whereby expected gained utility values of all data items included in the metadata do not need to be calculated and compared. This speeds up the selection process and reduces the processing capacity needed in the equipment implementing the method. The minimum values applied in the exclusion can also be application-specific, in which case they vary according to the purpose of use. According to a preferred embodiment, utility value of a user data item is modified in phase 404 according to the properties of software data items related thereto. This embodiment is later described in FIGS. 8 and 9.

The metadata (and the modification and/or exclusion, if any, of step 404) provide related data items associated with the data items of the initial data set. The relevance and utility values denoted by the paths leading to the related data items are preferably used for calculating 405 expected gained utility values E(g) for them. The expected gained utility values obtained for the different data items are compared 406. The data item with the highest expected gained utility value is added 407 to the selection data set. When a new data item is added to the selection data set, the routine checks 408 whether an end criterion determined into the data system in advance is met.

The end criterion may be, for example, exceeding the maximum size set for the data to be synchronized; exceeding the maximum number of data items; or the non-attainment of minimum expected gained utility value (i.e. there are no data items left which would exceed the minimum value of expected relevance). If the end criterion is not met, the routine proceeds by adding 407 a new data item to the selection data set.

Thus the criterion that is to be met is dynamically determined based on the highest (expected) utility among the utilities of other data items that are candidates for the selection data set. The utility of a candidate data item meets the predetermined criterion if it exceeds the highest utility among the utilities of other data items and in, this case it is selected to the selection data set.

Once the end criterion is met, the selection data set, which typically comprises related data items defined according to the initial data set and the end criterion, is synchronized 409. In this connection, the changes made to the selection data set since the last synchronization event can be checked and the changed data items, or at least data about the changes, can be sent to the other party involved in the synchronization. It is to be noted that as a modification to the above description, only the relevance values can be used for selecting the data items (in the comparison 406 or as an end criterion 408). The data selection according to steps 401-408 described above can be carried out in one device participating in the synchronization, in some of the devices, or in all of them.

The selection data set can be synchronized using any synchronization method. The synchronization may be carried out using a protocol based on the SyncML standard, although the scope of application of the invention is not restricted thereto. According to the SyncML standard, a synchronization session is first initialized in step 409 to select the database to be synchronized. A SyncML client device (TE) comprises a Sync Client Agent executing the SyncML protocol. The client agent may send the SyncML server (S) a SyncML message (Client Modifications) containing information about the changes made to the selection data set since the last message was sent. The SyncML server comprises a Sync Server Agent, which controls the synchronization, and a Synchronization Engine, and it usually waits for the client's initiative for the synchronization. The SyncML server synchronizes the data, i.e. analyses the changes made to the selection data set and harmonizes the data items (makes the necessary additions, replacements and deletions). The SyncML server then sends the client device a Server Modifications message which comprises the information about the changes made to the selection data set since the last synchronization message from the server S. Although simple, the above example serves to illustrate synchronization based on the SyncML standard.

It is also possible to use a modified SyncML protocol, in which case the data to be synchronized can be selected during the initialization of the synchronization session. According to one embodiment, it is also possible to define during the synchronization session whether the terminal TE functioning as a SyncML client and the server S functioning as a SyncML server support adaptive synchronization. In that case the TE uses the initialization message to request the adaptive synchronization type for use, the synchronization type being provided with a specific Alert code in the SyncML standard. If the S supports adaptive synchronization, the routine may proceed according to steps 402-408 described above to select the selection data sets in the synchronization client device TE and the synchronization server S. When the TE has determined the selection data set, it sends the modifications (Client Modifications) that have taken place since the last synchronization session to the synchronization server S. The TE may also send additional requirements relating to the determining of the selection data set, for example that a particular data item must be included in the set, which the server S must take into account when selecting the selection data set. TE preferences and other data relating to adaptive synchronization may be transmitted in a Meta element and in an EMI field, for example. The S selects (402-408) its selection data set in a similar manner. The server S preferably carries out the selection such that at least the data item modifications sent by the TE are taken into account. Alternatively, it is possible that the S informs the terminal TE about the selection data set it has selected prior to the synchronization. This, however, causes increased delay and adds to the amount of data to be transferred.

The S harmonizes the data items in the selection data set it has selected on the basis of the modifications sent by the TE and those made into the database (DB) synchronized by the server S. After the harmonization, the S sends the modifications (Server Modifications) that have taken place in the selection data set since the last synchronization session to the TE. On the basis of the modifications, the TE modifies the data items in its memory MEM. According to an embodiment, the TE may send information about the initial data set and other preferences, if any, during the initialization to the server S, which selects the selection data set on the basis of the metadata and the initial data set.

Instead of using a synchronization protocol to transfer the software data items in the selection data set, it is also possible apply other techniques to transfer the data items to a target device, e.g. to the terminal TE. Conventional software downloading can be used, and, according to one embodiment, a Device Management Protocol partly similar to the SyncML protocol is used.

Figure 5:
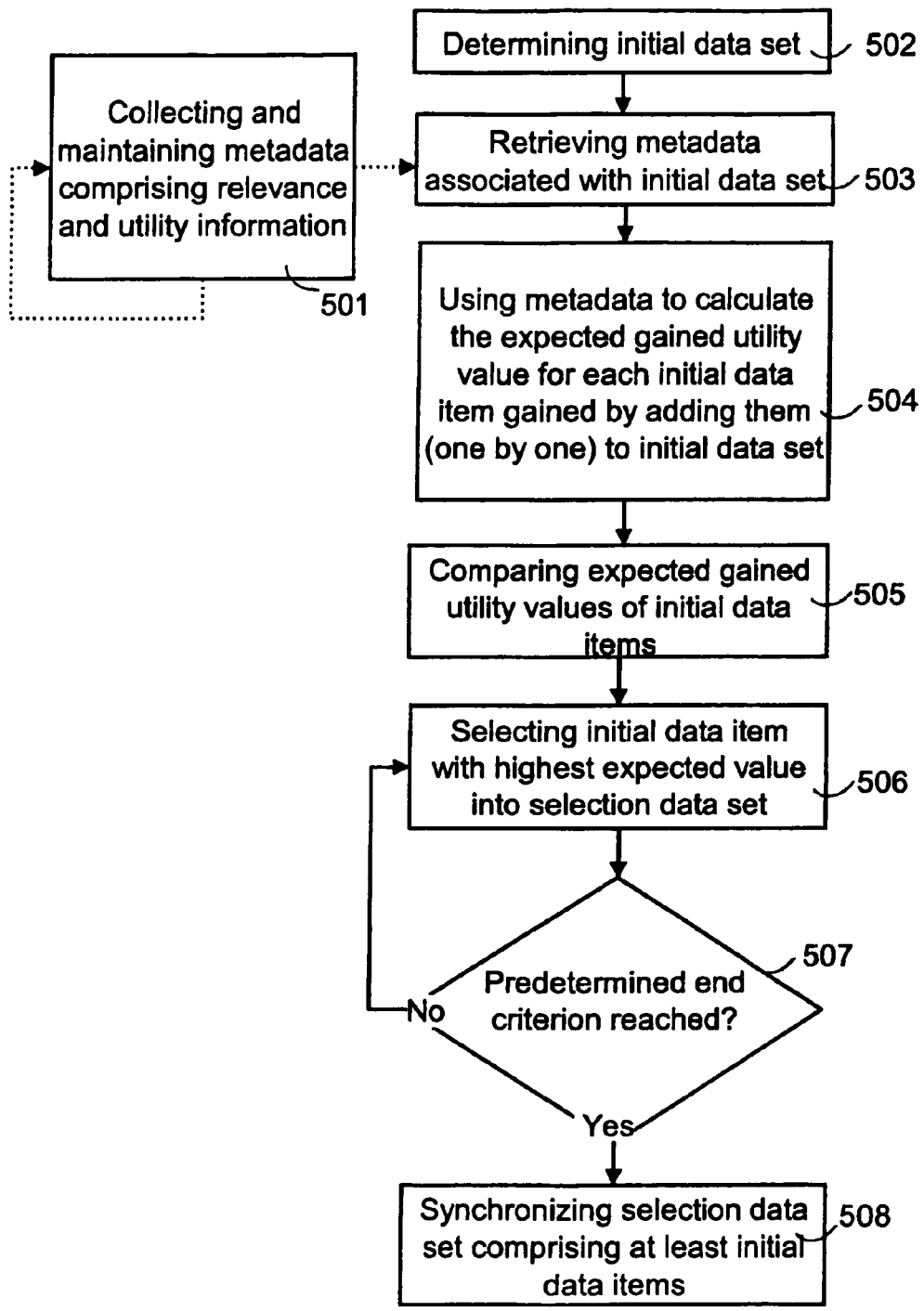
FIG. 5 is a flow diagram illustrating another method for adaptive selection of data to be synchronized.

FIG. 5 shows a method according to a second preferred embodiment of the invention in which the metadata can be used also for excluding data items of the initial data set. Metadata, which can be updated in the above described manner and which comprises relevance and utility information, is collected 501 into the system. The relevance and utility values of the data items can be changed, even if the data items concerned were in the initial data set. When a need arises to carry out synchronization, an initial data set is determined 502. Next, at least metadata associated with the initial data items of the initial data set are retrieved 503, i.e. the links between the initial data items are defined. The metadata may also be modified before phase 504.

The importance of the initial data items with regard to other initial data items is calculated 504. This can be achieved experimentally by removing one data item at a time from the first data set and by determining, on the basis of the metadata, the expected gained utility value to be obtained if the removed data item is added back to the first data set. The expected gained utility values calculated for each initial data item are compared 505. The initial data item with the highest expected gained utility value is added 506 to the selection data set. When a new initial data item is added to the selection data set, the routine checks 507 whether the end criterion determined into the data system in advance is met. The end criterion may be for example the maximum size set for the data to be synchronized, the number of the initial data items, or the non-attainment of the minimum value set for the expected gained utility value. If the end criterion is not met, the routine proceeds by adding 506 the new initial data item to the selection data set. When the end criterion is met, the initial data items in the selection data set can be synchronized 508. This allows the least relevant initial data items to be removed from the initial data set.

The embodiment of FIG. 5 provides an advantage in that it allows initial data items that have typically been determined in the initial data set on a relatively permanent basis to be placed into an order of relevance and only the most relevant initial data items to be synchronized. The functions shown in FIGS. 4 and 5 can also be combined, in which case the remaining initial data items are considered to provide the initial data set (step 402) and thus instead of entering step 508, the routine may proceed through step 403 to assess the relevance of the data items related to the initial data items.

It is also possible to apply the method such that data items remaining outside the selection data set after the end criterion has been met are automatically removed.

Data amount can be used as the end criterion in steps 408 and 507. In that case the size of the selection data set is always checked after a new data item has been added. When a predetermined size limit is reached, the synchronization of the selection data set may begin. According to a preferred embodiment, it is also possible to synchronize data items (or information relating to modifications made to them) one at a time, starting from the data item that is closest to the initial data item. When the predetermined maximum size limit for the data to be synchronized is reached, the synchronization is interrupted. The terminal TE may also send the synchronization server S a message when the maximum size limit is exceeded so that the S no longer sends data items for synchronization. In this embodiment, the selection data set is selected during the synchronization, unlike in FIGS. 4 and 5. The embodiment's advantages appear in cases where the size of the data items is not known, the calculation of the size of the data items requires a large processing capacity, or the server does not know the memory space available at the terminal.

According to a further embodiment, data item size is also taken into account in the comparison (steps 406 and 505). The ratio of the expected gained utility value E(g) (or the gained utility value g) to the data amount can be calculated for the data items. The data item having the highest E(g) per kilobyte is selected (407, 506) into the selection data set. This allows smaller data items to be preferred over larger ones. However, the comparison must be defined such that a small data item of low relevance is not preferred over a large data item of high relevance. This can be accomplished for example by applying a logarithm of data item size, instead of size, in the comparison.

According to yet another embodiment, the user interface UI;SUI can also be used for inquiring the user about the need for synchronizing one or more data items (before step 409 or 508). This embodiment is useful when large data items are concerned and mainly when the synchronization is to be carried out with a terminal which has a very limited storage capacity.

The above-described embodiments are typically applied at the synchronization server S, which selects the selection data set to be synchronized, and, thereby, has an effect on the amount of data to be sent to the terminal TE, which typically has relatively limited memory resources. The present method can also be used in the terminal TE for selecting a selection data set, the modifications made to the set being informed to the synchronization server S. Usually the number of data items added to the terminal TE by the user is fairly small, and thus all new data items (or other modifications made at the terminal TE) can be easily synchronized. However, if savings in time or in transfer costs are to be aimed at, the above solution can also be used to limit the amount of data to be transmitted from the terminal TE for synchronization.

In server-to-terminal synchronization, different values (relevance, utility) are preferably used in the metadata or in other criteria related to the selection of the data items than in terminal-to-server synchronization. At the server S side, the purpose may be to limit the required memory space (for the TE), whereas the aim at the terminal TE may be to save the processing resources needed for the comparison and selection of the data items. An embodiment of the solution of the invention provides various profiles (with different metadata or different exclusion/end criteria) for different transfer situations. Fast synchronization can be determined for expensive transfer links (through public mobile communications networks) to only synchronize particularly important data items. Full synchronization can be carried out in a local area network of a company, for example.

Figure 6:
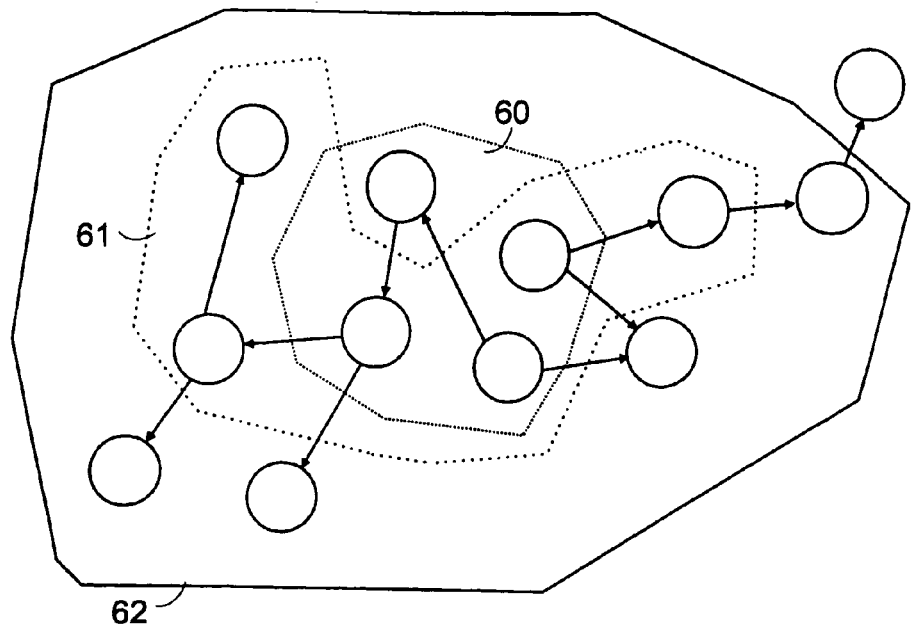
FIG. 6 shows an initial data set and adjacent data items associated with it.

FIG. 6 further illustrates the initial data set and the selection data set. The initial data set 60 defined with a dotted line comprises four data items with links that illustrate their relationships with other data items. The circles in FIG. 6 illustrate all data items which according to the metadata links are in some way associated with the initial data set 60. A dashed line 61 defines the selection data set to be synchronized, obtained by employing the method of the invention. As already described above, one data item at a time is preferably added to the selection data set 61, the data items that are closest to the initial data items being typically the most important ones as well. It should be noted that the selection data set 61 does not comprise all the data items of the initial data set, i.e. the method illustrated in FIG. 5 has been used. FIG. 6 further shows a so-called pre-excluded set, defined with a continuous line 62. Expected gained utility values have been calculated for the data items in the set 62, which is selected using the exclusion of step 404. A data item with a too low relevance value, for example, has been left outside the set 62. It should be noted that in addition to software data items, the selection data set 61 may also comprise user data items, the selection of which does not take compatibility into consideration. According to an embodiment, a reference user data item, which is always included in the initial data set and which has links to other data items, is added to the initial data set 60. The user data item itself is not a subject of synchronization, but it defines the data items that are to be taken into account when the selection data set is selected.

According to a preferred embodiment, the metadata may define relationships between user data items and software data items and between software data items. The relevance and utility of software data items may be determined and maintained in metadata for software data items as illustrated above (especially in phase 401 of FIG. 4).

Figure 7:
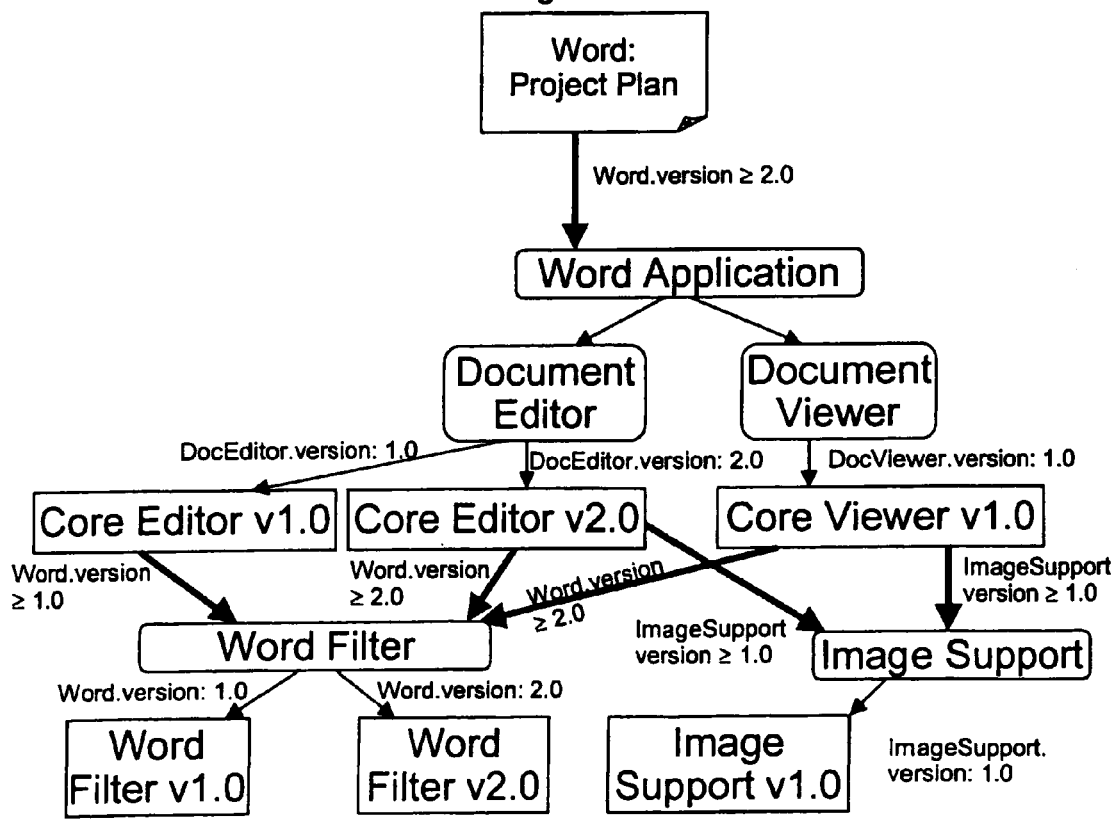
FIG. 7 illustrates an example relationship scenario for a word processing file.

FIG. 7 illustrates an example of a relationship scenario for a user data item; a word processing file "Project Plan". From the word processing file "Project Plan" there is a link to a word processing application "Word Application" which refers to two applications "Document Editor" and "Document Viewer". According to a preferred embodiment, virtual data items are determined in metadata describing relationships between software data items. Virtual data items represent a choice between alternative data items. In FIG. 7 the rounded blocks (Word Application, Document Editor, Document Viewer, Word Filter and Image Support) represent virtual items. A virtual data item can generally be a user data item or a software data item. The former can be used for document versioning, for example, and the latter for representing e.g. a choice between applications or between different versions or implementations of a software component. For example, a virtual software data item for a word processing application might represent the choice between an editor application and a viewer application as in FIG. 7, a virtual software data item for a software library might represent a choice between different versions of the software library, and a virtual software data item for the user interface component of an application might represent a choice between a complicated, feature-rich user interface for desktop computers and a simple user interface having only basic functions for mobile terminals. Thus, virtual data items can be used for application selection, software management and terminal adaptation, among other things.

According to a preferred embodiment a user data item is associated (preferably in the metadata) with a compatibility requirement and the alternative software data items are associated with compatibility information. The compatibility information is compared with the compatibility requirements when software data items are selected. This is illustrated in FIG. 7, where the file "Project Plan" is considered as the initial data item, in this case user data item, and has a compatibility requirement defining the word processing application to support a version 2.0 file format or later. From a virtual software data item "Document Editor" there is a link to two possible editor files, "Core Editor v1.0" and "Core Editor v2.0", the link defining compatibility information for the files as versions 1.0 and 2.0, correspondingly. From the "Core Editor v2.0" there is also a link to a virtual software data item "Image Support" (with a compatibility requirement for an Image Support version $\geq 1.0$). From the editor files there are dependency links (with compatibility requirements for Word versions $\geq 1.0$ and $\geq 2.0$ respectively) to a virtual data item "Word Filter" that has further links to two filter files, namely "Word Filter v1.0" and "Word Filter v2.0". From a virtual software data item "Document Viewer" there is a link to a real data item "Core Viewer v1.0", from where there are links to a virtual software data item "Word Filter" (with a compatibility requirement for a Word version $\geq 2.0$) and to the virtual software data item "Image Support" (with a compatibility requirement for an Image Support version $\geq 1.0$). The virtual software data item "Image Support" is dependent on a file "Image Support v1.0". Although not shown in FIG. 7, the links may also comprise utility and/or relevance values to be used when comparing software data items and/or when determining the utility and/or relevance of the user data item "Project Plan" and the links thereto.

Figure 8:
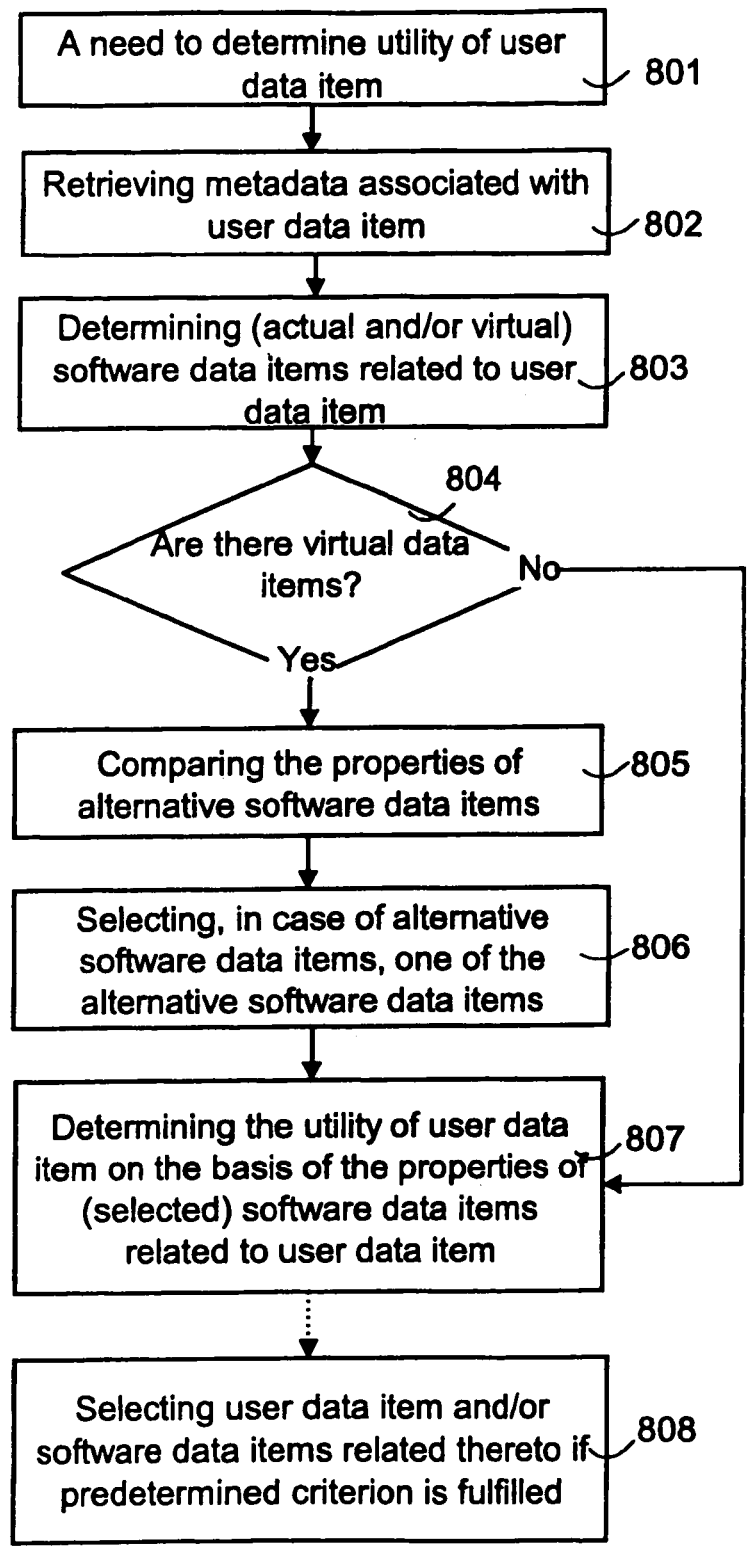
FIG. 8 is a flow diagram illustrating the determination of utility according to a preferred embodiment of the invention.

FIG. 8 illustrates a preferred embodiment in which the utility of a user data item is determined on the basis of the properties of one or more software data items related to the user data item in the metadata. A need 801 to determine utility of a user data item may arise when metadata 401, 501 is being determined or when metadata is modified prior to selecting the selection data set to be synchronized. The need 801 may also exist when the software configuration of the data terminal is being evaluated. The metadata associated with the user data item is retrieved 802 and the related data items (virtual and/or real) are determined 803.

If there is at least one virtual data item (804), one or more properties of alternative software data items under the virtual data item are compared 805. Any property or a combination of properties can be used to compare software data items. Such properties are size, compatibility information (e.g. a version number), utility and relevance. On the basis of the properties one of the alternative software data items (and the related software data items thereof) is selected 806. It should be noted that there are often further software data items under the alternative software data items and in order to decide between alternative software data items, the properties of the further software data items must be determined.

After the related software data items are determined (or selected in phase 806), utility is determined 807 for the user data item on the basis of the properties of the software data items related thereto. Such properties are size, compatibility information, utility and relevance of the related software data items. One or more properties can be taken into account when comparing alternative software data items. Size is a particularly good criterion; the utility of a user data item can be "penalized" if it requires a large amount of software data to be downloaded as well. The properties of related software items may affect the utility of the user data item in many ways. According to one embodiment, the size of the related software data items is added to the size of the user data item. According to another embodiment, the (combined) utility of the related software data item(s) is added to the utility of the user data item (representing how software features may increase the usefulness of a user data item). Further, the utility of the user data item may be multiplied with the (combined) utility of the related software data item(s) (representing how software features that increase the usefulness of a document may have a greater effect if the document was very useful in the first place). If the relationship between a user data item and a software data item has a relevance value, the relevance value may be used for example by multiplying the utility of the software data item with the relevance value before applying the utility of the software data item to the utility of the user data item.

Utility may be determined as the utility value ui for the links to the user data item illustrated above. The utility value may be entirely based on the determination illustrated in FIG. 8 or some other criterion may be also taken into account, e.g. user actions. According to an embodiment, it is also possible to apply some function to the utility or to the property used to determine the utility. For instance, size is modified in order to be able to also select a user data item requiring a large software data item. One way of doing this is to apply a function such as a logarithmic function to software data item sizes before they are used to modify the utility of a user data item. This further enables to enhance the probability of user data items that have burdening related software data items to become selected.

Step 808 illustrates that the utility value based on the properties of the related software is used when deciding whether to select the user data item to be synchronized and/or, according to another aspect of the invention, whether to select the software data items related to the user data item to be added or removed. The user data item and one or more software data items related thereto are selected 808 to the selection data set for synchronization and/or the related software data items are selected to be added or removed in response to the utility (or utility and one or more other properties or utility combined with one or more other properties) of the user data item meeting a predetermined criterion. For instance, it is possible to use the embodiments illustrated in FIGS. 4 and 5 in which the utility value is used when calculating expected gained utility values E(g) for candidate data items. Thus the criterion may change dynamically and it may be the highest expected utility among other candidate user data items. It is important to note that any other predetermined criterion and algorithm may be used to determine whether to select the user data item. There may be simply a minimum threshold value for utility, and user data items having a utility of at least the threshold value are selected. The criterion and the utility may also be used so that a maximum value not to be exceeded is defined. For instance, the criterion is met if the size of the related software data units (used for determining utility) does not exceed a predetermined value.

After one or more software data items have been synchronized or transferred to the data terminal, the metadata of other user data items (with which the same software data items are associated) are preferably adjusted (e.g. in phases 401, 404 or 501) such that the other user data units are not burdened by the software data units already synchronized. For instance, when a certain application is installed to a terminal, the utility values for further documents that are candidates for synchronization to the same terminal and require the application are adjusted to take into account that no extra software is needed. Alternatively, the utility of a user data item can be calculated dynamically at the point where it is considered for inclusion in the selection set. In that case the metadata of the software data items can be adjusted instead. For example, the software data items may be provided with flags such that their size is considered to be zero when calculating the utility of another user data item. Yet another option would be to maintain a separate list of software items available on the terminal and disregard software items on the list. These options may be accomplished by checking the available software components of the terminal prior to synchronization and by modifying the metadata if necessary.

The preferred embodiment of FIG. 8 enables to take into account the software related to the user data item that needs to be installed when deciding whether to select the user data item to be synchronized.

According to a preferred embodiment, the user data item is associated (preferably in metadata) with a compatibility requirement and the alternative software data items are associated with compatibility information. In this embodiment the compatibility requirement is used in phase 805, i.e. the compatibility requirement is compared with the compatibility information associated with the alternative software data items. Only those software data items that are compatible with the user data item are considered when selecting the software data items in phase 806.

There are many possible ways to determine and use utility and relevance for software data items, some of which are illustrated in the following. A software data item, e.g. an application, does not necessarily have any utility in itself, in some cases it only allows the utility of the user data item to be realized. An example of such an application is a document viewer. Other applications, such as document editors, may increase the utility of the user data items (by making the documents editable). The utility value would normally be assigned when the application is made available. The maintainer of the software repository can in this way have an influence on how fast software spreads; assigning a high utility value will make the software spread faster. The utility value of an application can also be dynamically changed, depending on how users behave. If users use an application often, the utility of the application should be increased. Similarly, the utility should be decreased if the application is used seldom or not at all. These changes can be applied globally or across a user type, such as corporate users, as well as individually. For example, if a specific user uses an application seldom, the application's utility for that user would be decreased, and once it is below a threshold value the application could be uninstalled as illustrated in FIG. 5 (applying the method that data items remaining outside the selection data set after the end criterion has been met are automatically removed). If the maintainer does not wish to assign utility values to software data items, a low default utility value could be originally assigned to all software data items. The software data items would then slowly gain utility as people use them, or lose utility if people do not use them. For instance, if an application that increases document utility (such as an editor) is chosen over the "basic" application with no utility (such as a viewer), then the utility of the application should be added to the overall utility of the user data item referring to the application, taking the relevance into account. For example, if a document (user data item) has utility 3, a related editor has relevance 0.5 and utility 6, and a related viewer (the basic application) has relevance 1.0 and utility 0, then the alternatives are either document+viewer with a utility of 3, or document+editor with a utility of 3+0.5*6=6. Of course, some other function than simple addition can be determined for combining the utilities of documents and applications. It should be noted that a software data item can in this manner increase the utility of an arbitrary number of user data items.

If a software data item provides the bare minimum of functionality for using the user data item, the relevance can be determined to be 1.0. In most cases, this kind of software data item is some sort of viewer application for the user data item. If the software data item provides further functionality than the bare minimum, the link has a normal relevance value. In most cases the software data item is then some sort of editing application. The relevance can be set similarly as for other data items. For instance, the relevance can be based on the probability that when a document of a certain type is needed, also the extra functionality of an application for the document will be needed.

The relevance of a software data item would normally be assigned when the software data item is made available. However, it can also be changed dynamically: If the selection process neglects to choose an application to the selection set (choosing e.g. the application with the bare minimum functionality instead), and the user then explicitly installs the application to his terminal anyway, the relevance of the application should be increased. Similarly, if the user explicitly removes an application, the relevance of the link that caused the application to be fetched to the terminal should be decreased. Similarly to utility, a low default relevance could be used if the maintainer does not wish to add relevance values for new software data items.

In the following, referring again to FIG. 7, the selection of software data items related to the user data item "Project Plan" is illustrated. All data items are selected on the basis of relevance and utility values (not shown in FIG. 7). Software data items are traversed recursively until a "leaf"

data item is found. When at a virtual node, the choice of the link preferably depends first on compatibility and secondly on the size of the alternative links. First a Word application is selected based on the dependency link from the Project Plan, and also the requirement for a Word.version $\geq 2.0$ is stored.

Next step is to choose between the Document Editor and the Document Viewer. For this the size of the Document Editor and the size of the Document viewer need to be known. The size of the Document Editor depends on whether the Core Editor v1.0 or the Core Editor v2.0 is used. To make the choice, the sizes of both options need to be known. Since there is a dependency relation between the Core Editor v1.0 and the Word Filter, the size of the Word Filter must also be taken into account when calculating the total size effect of choosing the Core Editor v1.0. This is determined by determining the size of the Core Editor v1.0 and the size of the Word Filter. For this the Word Filter version needs to be selected. The stored condition restricts the selection to version 2.0. Also the size of the Core Editor v2.0 is determined by determining the size of the Core Editor v2.0, the size of the Word Filter v.2.0 and the size of the Image Support, of which only one version is available (Image Support v1.0).

The sizes are summed: The total size effect of choosing the Core Editor v1.0=the size of the Core Editor v1.0+the size of the Word Filter v2.0 and the total size effect of choosing the Core Editor v2.0=the size of the Core Editor v2.0+the size of the Word Filter v2.0+the size of the Image Support v1.0. The editor version is selected based on size, relevance and utility values. In this example it is assumed that the Core Editor v2.0 has better utility, but the Core Editor v1.0 is smaller in size. It is also assumed that the current bandwidth is high enough and there is enough space on terminal, so the size does not matter too much: The Core Editor v2.0 is chosen (along with the Word Filter v2.0 and the Image Support v1.0). The size of the Document Viewer is determined similarly as that of the Document Editor, the total size effect being the size of the Core Viewer v1.0+the size of the Word Filter v2.0 (chosen due to the stored condition)+the size of the Image Support v1.0. The Document Editor and the Document Viewer can be compared on the basis of size, relevance and utility: The Editor is chosen since it has better utility and since size was assumed not to be very significant in this example.

According to another embodiment, heuristics may be used to make the software data item selection more efficient, so that the size of all related software data items need not be resolved. One example of such heuristics, in a choice situation (at a virtual software data item) is to always select a software data item already present at the terminal, if possible. This heuristic would usually minimize the number of software data items that need to be transferred to the terminal. Another example of such heuristics is not to take into account further choices, but to only consider the immediate choices and their relevance, utility, size etc. attributes. The problem of decision tree optimization is well known and there are many known algorithms that can be applied, such as the use of greedy algorithms (to only consider immediate choices and go with what looks to be the best in a particular situation).

The methods described in FIGS. 4 and 5 may be used for comparing the utility and relevance values of software data items. Similarly to size, the overall utility of an application, in this example of the Word application, depends on the included components. For instance, it may be the sum or the product of the utility values of the included components. Since the set of the included components needs to be resolved in any case in order to find out the total size, utility can be calculated at the same time. Relevance values can also be used when calculating the overall utility of an application, e.g. by multiplying the utility of a software data item by its relevance, as shown previously in the example where the utility of document+viewer and document+editor were calculated.

According to one embodiment the links are equipped with a flag that enables a link to specify that the utility of this component should only be used for component selection and should not be added to the overall utility of the application. This flag would be used by links referring to components that do not provide real additional end-user value. Naturally no utility or relevance values are needed in a link that is the only link from a virtual software data item; in this case the link needs to be followed. An example of such a link is the link between the virtual software data item "Image Support" and the software data item "Image Support v1.0".

After this the chosen items can be added to the selection data set to be synchronized or the properties of the chosen items are used to determine the utility of the user data item "Project Plan". Thus the properties of the software data items can be used to compare them for at least two purposes: For selecting appropriate software data items to be synchronized (for example according to the methods described in FIGS. 4 or 5) and for determining the utility of a user data item.

In addition to a comparison against compatibility requirements in the metadata, compatibility information in metadata may also be compared against terminal properties according to one embodiment. For example, compatibility information of a software data item may state that it is binary compatible with a certain operating system, application programming interface or user interface platform. This information is then compared with the properties of the terminal to find out whether the software data item is compatible with the terminal or not. A software data item that is not compatible with the user's terminal should not be selected. Compatibility is not necessarily a yes/no issue, there may also be software data items whose compatibility information states e.g. that the software data item works best with a screen resolution above 128×128 pixels, but also works well for a 256×128-pixel screen. This data item could be synchronized to a terminal with a lower screen resolution, but only if there was no other alternative with better compatibility. This embodiment further improves the appropriateness of the selected data.

Figure 9:
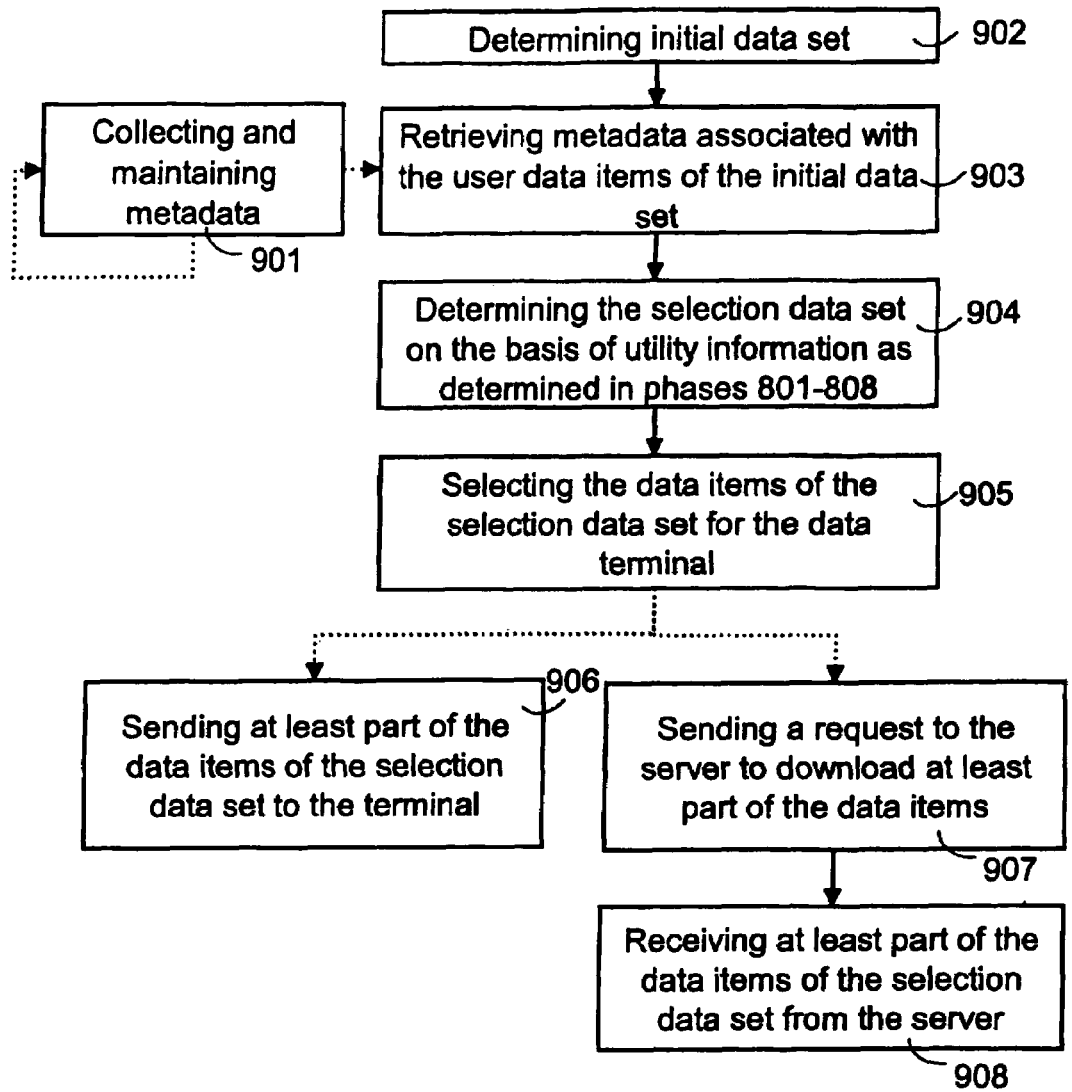
FIG. 9 is a flow diagram illustrating a software downloading method according to a preferred embodiment of the invention.

FIG. 9 illustrates a method for adaptively selecting software for a data terminal according to a preferred embodiment of the invention. In phase 901 metadata on dependencies between user data items and software data items and between software data items is maintained. As already described, the links of the metadata may comprise utility information and relevance information. The metadata may further comprise compatibility requirements/information and size requirements/information, or they may be determined elsewhere.

There are many situations where the initial data set is determined 902: As ordinary synchronization of user data items is done where at least one user data item has a dependency on one or more software data items. Phase 902 may also be carried out when the terminal TE needs a software configuration check or updating e.g. on the basis of a user request or a certain time interval (e.g. a virus protection software may require regular updating). This phase 902 may also be initiated when a file is selected and the required software does not exist in the terminal TE, or when a user data item requiring certain software configuration is being synchronized to the terminal. Thus at least one (initial) user data item is selected in phase 902, the user data item may already be synchronized to the data terminal.

The metadata associated with at least one user data item selected to the initial data set or referred to from a user data unit in the initial data set is retrieved 903. The selection data set to be synchronized is determined in phase 904 using, typically among other criteria, the utility information of the user data item that has dependencies on one or more software data items. The utility information of the user data item is preferably determined on the basis of the properties of the related software data items as described above with FIGS. 7 and 8. When the utility of the user data item is determined, the decision whether to select the software data items for the data terminal can be carried out according to the methods illustrated in FIGS. 4 and 5, for example. As illustrated in FIG. 5, if the user data item is already synchronized, the utility can be experimentally determined in order to determine whether new software needs to be downloaded to the data terminal or whether some existing software needs to be removed from the data terminal. Metadata or the criterion used when selecting data units to the selection data set may be tailored in many ways as already illustrated. The tailoring may be application-specific, user-specific or terminal-specific, for instance. Further, the metadata and/or the criterion may be selected or modified according to available network resources.

The features 901-905 can be carried out in a server providing software to a data terminal or in a data terminal acquiring software from a server. These devices may be communicating using a synchronization protocol but are not limited thereto. Depending on the role of the device, either step 906 or 908 is continued after step 905.

When the device is functioning as a server providing software to a (client) data terminal, the data items of the selection data set are provided to be downloaded to the terminal TE. Preferably the user data items in the selection data set are automatically synchronized to the terminal and the related (and selected as in FIG. 8 in case of alternative items) software data items are arranged to be transferred to the terminal TE. The user of the terminal may be inquired about this. It is also possible to examine the status of the terminal, e.g. the available memory space, and to decide on the basis of the status whether to download the software data items to the terminal. When a request to download at least some of the data items in the selection data set is received, at least some of the data items (user data items and the related software data items) are sent 906 to the terminal TE.

As it is possible to take into account the preferences of the user, the properties of the terminal and also the network connection already when determining the selection data set, according to one embodiment, if the user data item meets the predetermined criterion, the related software data items are automatically sent 906 to the terminal without a separate request.

If the method is implemented in a (client) data terminal, the terminal sends 907 a request to the server for at least the selected software data items. The server responds and the data terminal receives 908 the data items and updates its software configuration.

Although not shown in FIG. 9, the metadata may be modified (as illustrated in phase 404 of FIG. 4) or some data items may be excluded before the step 904. Also a time-based transform function could also be used when modifying the metadata e.g. to increase the relevance or utility of a software update as time passes and the terminal's software becomes more obsolete. This would be useful as it does not force an update to happen at a specific time, allowing the update to happen at a convenient time and ensures that in case there is never a convenient time for the update, it will still happen eventually (even if inconvenient to the user). In some cases an alternative to modifying the metadata could be to use dynamic attribute values in the metadata, so that e.g. the utility of a data item would be always recalculated when needed. For example, the utility of a data item could be "3+number of months passed since Jan. 1, 2001".

As already mentioned, compatibility information may be compared against terminal properties also in the software downloading method illustrated in FIG. 9 to find out whether a related software data item (a candidate for selection data set) is compatible with the terminal or not. If any one of the related software data items is incompatible, it is not selected for the data terminal. This comparison may be carried out already before phase 404 and the incompatible software data items can be excluded. It is also possible to carry out the comparison later. According to a still further embodiment, one or more software data items already present in the data terminal may be removed if the utility of the user data item (to which the software data items relate) does not meet the predetermined criterion and/or if the utilities of the software data items do not meet the predetermined criterion. The features illustrated in FIG. 5 may be utilized in this embodiment and the assessment of the data items may be carried out periodically, for example. This embodiment enables efficient software configuration for the data terminal.

As the utility of a user data item is determined, according to a preferred embodiment, on the basis of the properties of the related software data items, some user data units may be left out of the selection data set because of some property of the software data item. For instance, an image viewer application may be so large that a first image of a certain type requiring the viewer application is not synchronized to a wireless terminal. If a second image of the same type is considered to be synchronized later, the first image should be reconsidered because now the burden of the application installation would be shared between both images. According to an embodiment, sets of potential selections are maintained in the synchronization system. When a first user data item would otherwise be chosen for the selection set but is left out because of one or more properties of a related software data item, the first user data item is added to the list of potential selections for that application. Next time a second user data item for which the same software data item(s) is associated is being considered for synchronization, the combined utility or the expected utility is calculated. The two user data items now share the burden of the application installation. If the combined (expected) utility is the largest of the current data item candidates, the software data item, the first user data item in the set of potential selections and the second user data item currently under consideration are added to the selection data set. After this the first user data item can be removed from the list of potential selections and the utility of further user data items are not burdened with the related software data items. This embodiment is especially useful when size is used to rule out data items, as it enables to take into account the real need of an application. Further, easy synchronization of earlier user data items that are now usable is enabled because the application required for their type is now installed. These sets of potential selections can be maintained in synchronization clients and/or servers. This embodiment can be applied with the embodiments illustrated in FIGS. 4, 5, 8 and 9.

It is apparent to a person skilled in the art that as technology advances, the basic idea of the invention can be implemented in various ways. The invention and its embodiments are therefore not restricted to the above-described examples but they may vary within the scope of the claims.

The invention claimed is:

1. A computer implemented method for selecting a data set to be synchronized from data collections of a data system, wherein the data system comprises user data items and software data items, the method comprising:

maintaining in the data system metadata defining relationship links between user data items and software data items, determining a utility value of at least one user data item on the basis of properties of one or more software data items related to the user data item in the metadata, selecting the user data item and one or more software data items related to the user data items to the data set for synchronization in response to the utility value of the user data item meeting at least one predetermined criterion, and synchronizing at least part of the data items of the selection data set.

2. A computer implemented method according to claim 1, wherein the size of the one or more software data items related to the user data item is calculated, and the utility value of the user data item is determined on the basis of the size of the related software data items.

3. A computer implemented method according to claim 1, the method further comprising:

maintaining further metadata comprising at least one virtual software data item to which at least the user data item refers and which represents alternative software data items, selecting one of the alternative software data items on the basis of the comparison of the alternative software data items, and wherein the utility value of the user data item is determined on the basis of the properties of the selected software data item and its related software data items.

4. A computer implemented method according to claim 3, wherein at least the relevances of alternative software data items under the virtual software data item are calculated, and one of the alternative software data items is selected on the basis of the comparison of the relevances of the alternative software data items.

5. A computer implemented method according to claim 3, wherein the utilities of the alternative software data items under the virtual software data item are calculated and considered in said selection step, and one of the alternative software data items is selected on the basis of the comparison of the utilities of the alternative software data items.

6. A computer implemented method according to claim 3, wherein the user data item is associated with a compatibility requirement and the alternative software data items are associated with compatibility information, the compatibility requirement is compared with the compatibility information associated with the alternative software data items, and only those software data items that are compatible with the user data item are considered when selecting the software data items.

7. A computer implemented method according to claim 1, wherein the criterion is dynamically determined based on a highest utility among the utilities of other user data items that are candidates for the selection data set, and the utility of the user data item meets the predetermined criterion if it exceeds the highest utility value among the utility values of other user data items.

8. A computer implemented method according to claim 7, wherein the expected gained utility value is determined for the user data item on the basis of the utility value and the relevance of the user data item, the expected gained utility value of the user data item is compared with the expected gained utility values of other user data items, and the user data items having the highest expected gained utility values are selected to the data set to be synchronized.

9. A computer implemented method according to claim 1, the method further comprising:

adding the user data item to a list of potential selections if it is not selected to the data set for synchronization, determining a combined utility value or combined expected utility value for the user data item and for another user data item, which are both related to the same one or more software data items when the other user data item is under consideration to be synchronized, and selecting the user data item, the other user data item and the one or more software data items to the selection data set if the combined utility value or combined expected utility value meets the predetermined criterion.

10. A computer implemented method for selecting software configuration of a data terminal, the method comprising:

maintaining metadata defining relationship links between user data items and software data items, selecting at least one user data item, determining a utility value of the user data item on the basis of properties of one or more software data items related to the user data item in the metadata, and selecting the software data items related to the user data item for the data terminal in response to the utility value of the user data item meeting at least one predetermined criterion, and requesting to transfer/sending at least part of the software data items of the selection data set to the data terminal.

11. A computer implemented method according to claim 10, the method further comprising:

sending the selected data items to the data terminal in response to a request from the data terminal.

12. A computer implemented method according to claim 10, the method further comprising:

sending a request from the data terminal to a server to transfer the selected software data items to the data terminal.

13. A computer implemented method according to claim 10, the method further comprising:

selecting also the user data item for the data terminal in response to the utility value of the user data item meeting a predetermined criterion, and arranging the user data item to be transferred to the data terminal.

14. A computer implemented method according to claim 10, wherein at least some of the related software data items are associated with compatibility information, the compatibility information is compared with the properties of the data terminal to which the software data items are to be transferred, and incompatible software data units are excluded from the selection.

15. A computer implemented method according to claim 10, the method further comprising:

removing at least one software data item from the terminal if the utility value of one or more user data items to which the software data item relates to does not meet the predetermined criterion.

16. A synchronization system configured to synchronize the data of at least two data collections, wherein the data system comprises user data items and software data items, the synchronization system being configured to:

maintain metadata defining relationship links between the user data items and the software data items, determine a utility value of at least one user data item on the basis of the properties of one or more software data items related to the user data item in the metadata, select the user data item and one or more software data items related thereto to a data set for synchronization in response to the utility value of the user data item meeting a predetermined criterion, and synchronize at least part of the data items of the selection data set.

17. A synchronization device comprising:

a memory configured to store metadata defining relationship links between user data items and software data items, the synchronization device being configured to:

determine a utility value of at least one user data item on the basis of the properties of one or more software data items related to the user data item in the metadata, and select the user data item and one or more software data items related thereto to a data set for synchronization in response to the utility value of the user data item meeting a predetermined criterion, and synchronize at least part of the data items of the selection data set.

18. The synchronization device of claim 17, the device being further configured to:

calculate a size of one or more software data items related to the user data item; and determine the utility value of the user data item on the basis of the size of the software data items related to the user data item.

19. The synchronization device of claim 17 further comprising that the metadata specifies a relationship between the at least one user data item and the one or more software data and has a relevance value, and the synchronization device is further configured to determine the utility value of the user data item on the basis of the relevance value in the metadata.

20. A server device comprising:

a memory configured to store metadata defining relationship links between user data items and software data items, wherein the server device is configured to:

select at least one user data item, determine a utility value of the user data item on the basis of the properties of one or more software data items related to the user data item in the metadata, select the software data items related to the user data item for a software configuration of a data terminal in response to the utility value of the user data item meeting at least one predetermined criterion, and send at least part of the software data items of the selection data set to the data terminal.

21. The server device of claim 20, the device being further configured to:

calculate a size of the one or more software data items related to the user data item, and determine the utility value of the user data item on the basis of the size of the related software data items.

22. The server device according to claim 20 wherein the metadata specifies a relationship between at least one user data item and the one or more software data and has a relevance value, and the server device is further configured to determine the utility value of the user data item on the basis of the relevance value in the metadata.

23. A data terminal comprising:

a memory for storing metadata defining relationship links between user data items and software data items, wherein the data terminal is configured to:

select at least one user data item, determine a utility value of the at least one user data item on the basis of the properties of one or more software data items related to the user data item in the metadata, select the software data items related to the user data item for the software configuration of the data terminal in response to the utility value of the user data item meeting at least one predetermined criterion, and send a request to transfer at least part of the software data items in the selection data set to the data terminal.

24. The data terminal according to claim 23, wherein the data terminal is configured to use at least one of size, compatibility information, utility and relevance properties of the software data items for determining the utility value of the at least one user data item.

25. The data terminal according to claim 23, wherein the data terminal is configured to select software data items related to the user data item to be added or removed from the configuration of the data terminal on the basis of the utility value based on properties of the software data items related to the user data item.

26. A computer software product comprising a computer readable medium having machine readable instructions embodied on the computer readable medium for causing a computer to control a synchronization device, wherein the computer software product comprises:

a program code portion for maintaining metadata defining relationship links between user data items and software data items, a program code portion for determining a utility value of at least one user data item on the basis of the properties of one or more software data items related to the user data item in the metadata, a program code portion for selecting the user data item and one or more software data items related thereto to the data set for synchronization in response to the utility value of the user data item meeting a predetermined criterion, and a program code portion for synchronizing at least part of the data items of the selection data set.

27. A computer software product comprising a computer readable medium having machine readable instructions embodied on the computer readable medium for causing a computer to control a data processing apparatus, wherein the computer software product comprises:

a program code portion for maintaining metadata defining relationship links between user data items and software data items, a program code portion for selecting at least one user data item, a program code portion for determining a utility value of the user data item on the basis of the properties of one or more software data items related to the user data item in the metadata, a program code portion for selecting the software data items related to the user data item in response to the utility value of the user data item meeting a predetermined criterion, and a program code portion for requesting to transfer/sending at least part of the software data items in the selection data set to the data terminal.

* * * * *